United States Patent Office 3,839,468
Patented Oct. 1, 1974

3,839,468
PROCESS FOR PRODUCING 2,3,6-TRIMETHYL-HYDROQUINONE
Yoshin Tamai and Kazuo Itoi, Kurashiki, Japan, assignors to Kuraray Co., Ltd.
No Drawing. Filed Feb. 20, 1973, Ser. No. 333,721
Claims priority, application Japan, Mar. 3, 1972, 47/22,647
Int. Cl. C07c 37/00
U.S. Cl. 260—621 H          8 Claims

ABSTRACT OF THE DISCLOSURE

An improved process for producing 2,3,6-trimethylhydroquinone consisting of catalytic reduction of 2,3,6-trimethyl-p-benzoquinone conducted in the presence of palladium catalyst and in an aliphatic ketone as solvent is disclosed.

DETAILED DESCRIPTION OF THE INVENTION

The present invention relates to an improved process for producing 2,3,6-trimethylhydroquinone (hereinafter referred to as TMHQ). More particularly, this invention is concerned with a process for producing TMHQ which comprises reducing 2,3,6-trimethyl-p-benzoquinone (hereinafter referred to as TMQ) with hydrogen in the presence of palladium catalyst and in an aliphatic ketone as solvent.

It is an object of the present invention to provide TMHQ in low cost and in higher purity. TMHQ is an important compound which is used as an antioxidant for oil and fatty compounds, an anti-ultraviolet-deteriorating agent for a rubber and a synthetic elastic substance, or an intermediate for preparing medicines. According to prior arts, TMHQ is prepared chemically by reducing TMQ with a reducing agent or prepared catalytically by reducing TMQ with molecular hydrogen in the presence of a noble metal, such as platinum or palladium, and in an organic solvent such as an alcohol, a hydrocarbon, an ether or an aliphatic carboxylic acid. For example, German Patent No. 1940386 provides a method for preparing TMHQ in higher purity in which aliphatic alcohols having carbon atoms of 3 to 5 are used as solvents in the presence of a catalyst, such as platinum or palladium. However, it has been found by the present inventors that an aliphatic alcohol solution of TMHQ, which is prepared by reducing TMQ with hydrogen in an aliphatic alcohol having 3 to 5 carbon atoms as solvent, colors gradually in air. This coloration is lesser than that of the solution which is formed by reducing TMQ in an aliphatic alcohol having 1 to 2 carbon atoms such as methanol or ethanol. However, the coloration of the former solution is dissatisfactory, because this coloration deteriorates remarkably the resultant TMHQ. According to our studies, the coloration seems to be caused by the fact that TMHQ prepared by reducing TMQ is again oxidized with oxygen contained in air into TMQ, and this TMQ forms an intermolecular complex with TMHQ. In order to prove the above hypothesis, a resultant compound, which is prepared by reducing with hydrogen in an aliphatic alcohol having 3 to 5 carbon atoms, was taken out in an inert atmosphere. The obtained reaction solution is colorless and clear without any coloration, and crystals of TMHQ obtained from this solution are pure white and are of higher purity. Referring to the above experiments, the coloration of the reaction solution is not affected by solvents in case the reaction solution is treated in an inert atmosphere, and any solvent is utilized if the solvent does not inhibit the hydrogenation of TMQ. But it is most important to utilize an expensive palladium most effectively in order to prepare TMHQ in low cost and, for this reason, a solvent adequate to reducing reaction of TMQ should be chosen. In other words, a process in which the palladium catalyst has a long catalyst life should be provided.

TMQ prepared by a chemical method generally has several impurities. Because these impurities are poisonous to a hydrogen reducing catalyst in the process for preparing TMHQ by catalytic reduction of TMQ, TMQ must be purified. However, these impurities can not be completely removed, so that the catalyst used in the catalytic reduction of TMQ results in a gradual lowering of its activity, and it often becomes difficult to use the catalyst repeatedly. After the studies on processes for maintaining an activity of the catalyst during a long period, it has been found that the lowering of an activity of the catalyst is prohibited and TMHQ is synthesized in high purity and in low cost by using an aliphatic ketone as reaction solvent.

In a brief summary, the gist of the present invention exists in the use of an aliphatic ketone as solvent in the process of reduction of TMQ in the presence of palladium catalyst.

In addition, the experiments prove that a reduction of aliphatic ketones does not occur in the conditions of the present invention.

In order to establish the effects of the present invention, the catalytic reduction of TMQ was conducted according to the process set forth in Example 1, and the catalyst was separated from the resulting reaction mixture, and the catalytic reduction using the recovered catalyst was conducted repeatedly. The results are shown in Table 1. In this Table the activity of catalysts is expressed in the time (in minutes) needed for terminating the reaction.

TABLE 1

| Reaction | Termination time of reactions (in minutes) | | | | |
|---|---|---|---|---|---|
| | 1 | 2 | 3 | 4 | 5 |
| Solvent: | | | | | |
| Tertiary butanol | 100 | 240 | 420 | >800 | |
| Diisopropylether | 120 | 320 | 480 | >800 | |
| Toluene | 130 | 450 | >800 | | |
| Ethyl acetate | 110 | 220 | 380 | >800 | |
| Acetone | 120 | 150 | 210 | 320 | 420 |
| Methylisobutylketone | 120 | 160 | 230 | 380 | 480 |

As can be seen from Table 1, an activity of the catalyst is maintained for a longer period by using aliphatic ketones such as that is acetone and methylisobutylketone as solvent in comparison with the process using other solvents. This shows that aliphatic ketones are used advantageously in commerce.

Other merits of the present invention exist in the fact that the solubility of aliphatic ketones for TMQ and TMHQ is higher than that of other organic solvents.

In Table 2, solubilities of common organic solvents for TMHQ at room temperature are shown.

TABLE 2

| Solvent: | Solubility of TMHQ (g./100 g. solvent |
|---|---|
| Ethanol | 38 |
| Tertiary butanol | 17 |
| Disopropylether | 1.8 |
| Toluene | 0.2 |
| Ethyl acetate | 15 |
| Acetone | 43 |
| Methylisobutylketone | 19 |

Therefore, using an aliphatic ketone as solvent causes an increase of reaction quantity per unit operation, and the present process is economically advantageous.

Furthermore, another merit of the present invention is that TMHQ in an aliphatic ketone produced by reduction suffers little coloration in case it is allowed to stand in air. Table 3 shows the degree of the coloration of TMHQ solution by use of a percent transmission after it is allowed to stand in air.

TABLE 3

| Solvent | Percent transmission | | |
|---|---|---|---|
| | 5 minutes | 15 minutes | 30 minutes |
| Acetone | 78.0 | 75.3 | 62.3 |
| Methylisobutylketone | 78.0 | 75.5 | 67.3 |
| Methanol | 70.0 | 55.6 | 3.1 |
| Tertiary butanol | 73.0 | 60.2 | 10.1 |

In Table 3, after preparation of 10 ml. of solution containing 1 g. of TMHQ, the solution was allowed to stand at room temperature for the predetermined time and its transmission was measured at 390 m$\mu$ of wave length. The lower percent transmission shows the higher coloration of the solution.

Aliphatic ketones used in the present invention preferably have 3 to 9 carbon atoms, and, in considering easy treatment and an economy, it is most preferable to use aliphatic ketones having 3 to 6 carbon atoms, for example alkanones such as acetone, methylisopropylketone and methylisobutylketone. An amount of the aliphatic ketone used in the reaction is 2–200 times that of TMQ by weight, preferably 3–30 times by weight. In addition, an amount of the solvent does not affect the reaction rate of the reduction. The palladium catalyst is preferably 0.003–0.6% by weight as palladium metal per TMQ. Palladium is used on well-known carriers, such as active carbon, barium sulfate and barium carbonate, preferably active carbon. The present invention is generally conducted at a temperature of 0–150° C. and under the hydrogen pressure of 1–50 atmospheres.

The present invention is further illustrated by the following non-limiting examples.

EXAMPLE 1

In 200 ml. of the solvent set forth in Table 1 was dissolved 20 g. of TMQ and the catalytic reduction was conducted in the presence of 0.2 g. of 3% palladium on active carbon (Kawaken Finechemical Co., Ltd.), under 5 kg./cm.$^2$ of hydrogen pressure, and at room temperature. The time required for terminating the reaction was measured. After completion of the reaction the catalyst was recovered by filtration under a nitrogen atmosphere. The recovered catalyst was used for the subsequent catalytic reduction of TMQ and the time required for terminating the reaction was measured in the same manner.

This procedure was repeated five times. The results are set forth in Table 1.

EXAMPLE 2

In 100 g. of acetone was dissolved 20 g. of TMQ, and the reaction was conducted by using 0.2 g. of palladium catalyst set forth in Example 1 and under 5 kg./cm.$^2$ of hydrogen pressure at room temperature. The hydrogenation was completed in 120 minutes. After the reaction, the catalyst was recovered by filtration under a nitrogen atmosphere. The same reaction was conducted by using the recovered catalyst to which 5% (by weight) of novel catalyst was added. The hydrogen absorption terminated in 120 minutes and the reaction was completed. The same procedure was repeated five times. The hydrogen absorption of every reaction terminated in the reaction time of 120 minutes which is the same as in the first reaction, and the reaction was completed.

The hydrogenation procedure using ethyl acetate instead of acetone as solvent was conducted under the same conditions. The first reaction was completed in 120 minutes, and nevertheless the second reaction was completed in 240 minutes; namely twice the first reaction.

As can be seen from the above results, the catalytic activity is maintained for a long period in case of using an aliphatic ketone as solvent.

EXAMPLE 3

In 100 g. of methylisobutylketone was dissolved 15 g. of TMQ and the reaction was conducted by using 0.1 g. of palladium catalyst referred in Example 1 at 80° C. and under 5 kg./cm.$^2$ of hydrogen pressure. The hydrogenation was completed in 90 minutes. Further, the reaction is repeated five times according to the process set forth in Example 1. Every reaction was completed in 90 minutes as well as the first reaction.

The same reaction was conducted by using tertiary butanol instead of methylisobutylketone under the same condition. In the first reaction the hydrogen absorption terminated in 90 minutes. Nevertheless the second reaction needed 150 minutes for terminating the reaction.

EXAMPLE 4

In 800 g. of acetone was dissolved 40 g. of TMQ, and the reaction was conducted by using 0.2 g. of palladium catalyst set forth in Example 1 under 10 kg./cm.$^2$ of hydrogen pressure and at 50° C. The hydrogen absorption terminated in 150 minutes. Then the catalyst was recovered by filtering the resultant solution. The reaction was repeated by using the recovered catalyst. The reaction terminated in 220 minutes. Further the reaction was conducted repeatedly in the same manner. The third reaction terminated in 330 minutes and the fourth and fifth reactions terminated in 480 and 550 minutes respectively.

In 800 g. of diisopropylether was dissolved 40 g. of TMQ, and the reaction was conducted at 50° C. in the presence of 0.2 g. of the said catalyst and under 10 kg./cm.$^2$ of hydrogen pressure. The hydrogen absorption terminated in 160 minutes. According to the manner similar to that applied to acetone solution the catalyst was recovered and the reaction was repeated. The second and third reactions were completed in 400 and 620 minutes respectively. The fourth reaction needed over 800 minutes for terminating the reaction.

What is claimed is:

1. In a process for producing 2,3,6-trimethylhydroquinone, wherein 2,3,6-trimethyl-p-benzoquinone is reduced catalytically in the presence of a palladium catalyst and in the presence of an inert solvent, the improvement which comprises employing an alkanone having from 3 to 9 carbon atoms as said solvent.

2. The process of Claim 1, wherein the alkanone is acetone, methylisopropylketone or methylisobutylketone.

3. The process of Claim 1, wherein the amount of the alkanone is from 3 to 30 times that of the 2,3,6-trimethyl-p-benzoquinone, by weight.

4. The process of Claim 1, wherein the palladium is supported on a carrier.

5. The process of Claim 4, wherein the carrier is active carbon, barium sulfate or barium carbonate.

6. The process of Claim 4, wherein the carrier is active carbon.

7. The process of Claim 1, wherein from 0.003 to 0.6 percent by weight of palladium metal is used of the weight of said 2,3,6-trimethyl-p-benzoquinone.

8. The process of Claim 1, wherein said reduction is conducted at a temperature of from 0° C. to 150° C.

References Cited

UNITED STATES PATENTS

| 3,723,541 | 3/1973 | Schuster et al. | 260—621 H |
| 2,259,936 | 10/1941 | Jung | 260—621 H |

FOREIGN PATENTS

| 7,011,586 | 2/1971 | Netherlands | 260—621 H |
| 595,514 | 12/1947 | Great Britain | 260—621 H |

BERNARD HELFIN, Primary Examiner

N. MORGENSTERN, Assistant Examiner